May 28, 1957 E. V. KOSKELA 2,793,563
COMBINATION FILM STRIP AND SLIDE PROJECTOR
Filed July 17, 1952 3 Sheets-Sheet 1

INVENTOR.
Elmer V. Koskela
BY
Mason, Kolehmainen,
Rathburn and Wyss
Attorneys

May 28, 1957 E. V. KOSKELA 2,793,563
COMBINATION FILM STRIP AND SLIDE PROJECTOR
Filed July 17, 1952 3 Sheets-Sheet 2
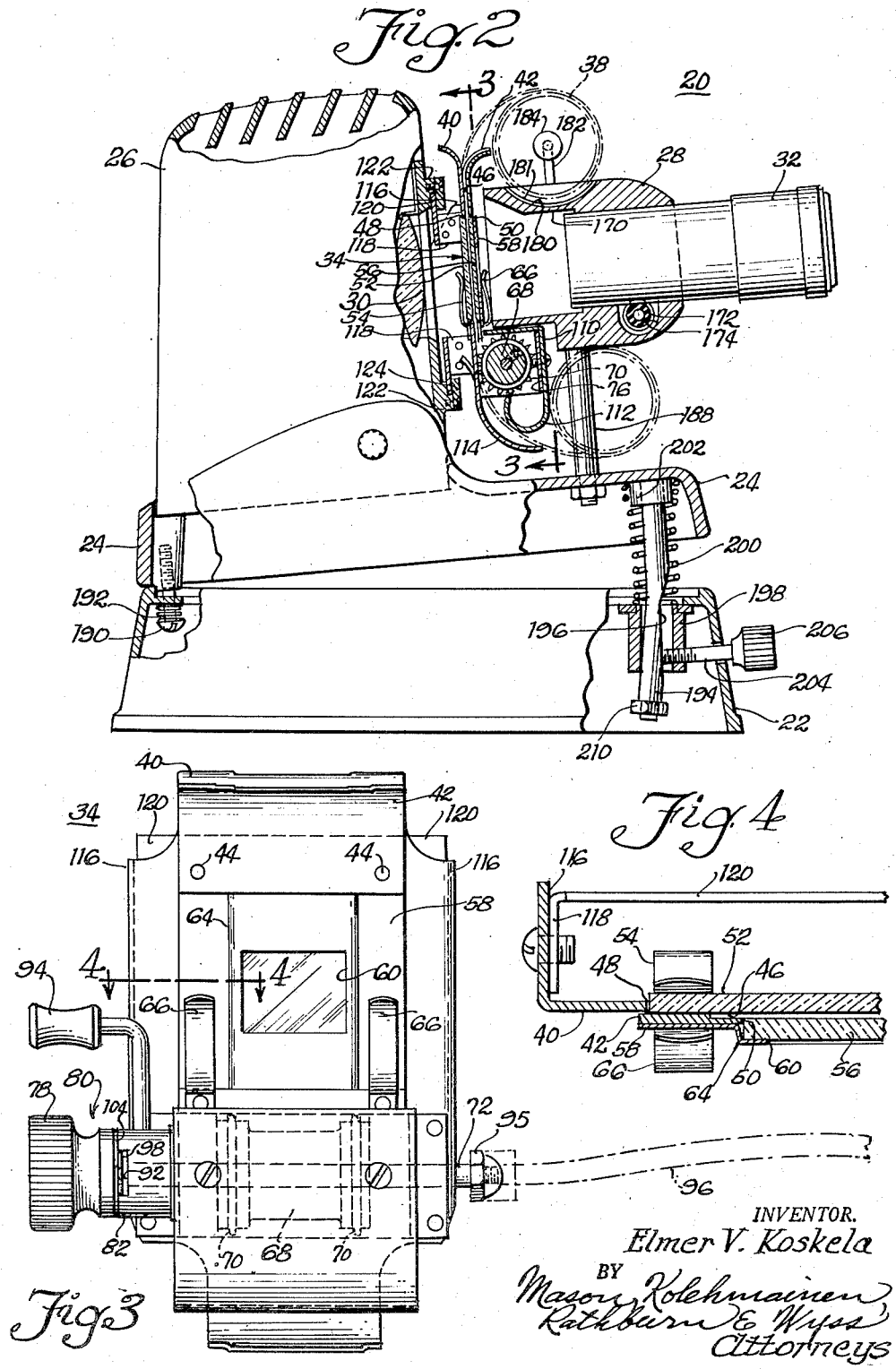
INVENTOR.
Elmer V. Koskela
BY
Mason, Kolehmainen,
Rathburn & Wyss
Attorneys

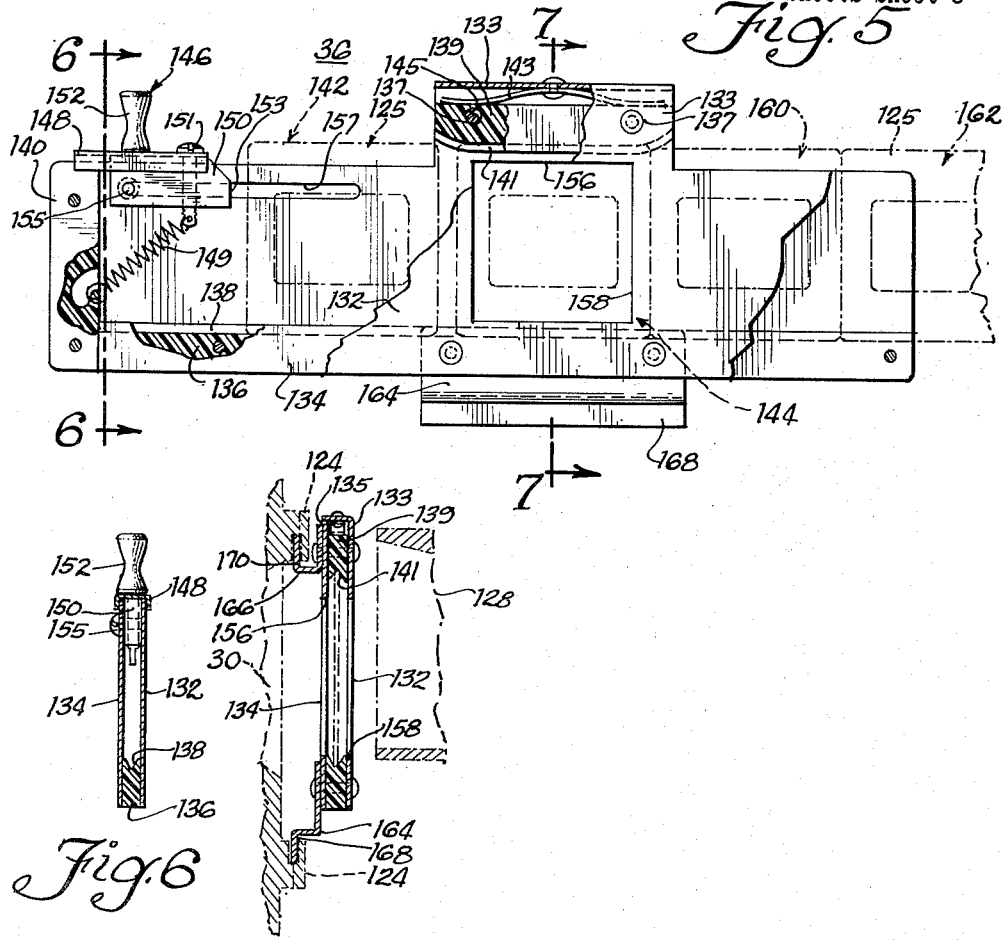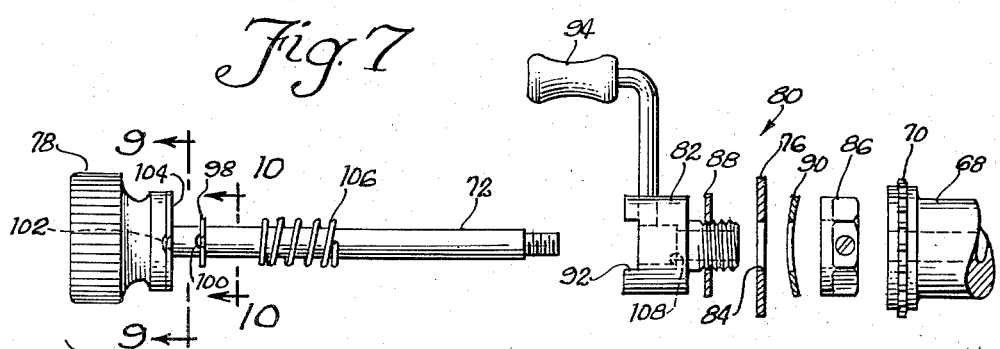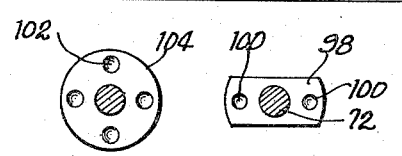

United States Patent Office 2,793,563
Patented May 28, 1957

2,793,563

COMBINATION FILM STRIP AND SLIDE PROJECTOR

Elmer V. Koskela, Chicago, Ill.

Application July 17, 1952, Serial No. 299,424

1 Claim. (Cl. 88—28)

This invention relates to a film projector and, more particularly, to such a projector which is capable of utilizing film in the form of either strips or mounted slides.

Although prior projectors are available for projecting either strip film or mounted film slides, it is often too expensive to obtain machines for use with each type of film. It is particularly desirable to have a single machine capable of utilizing both types of film, since material such as educational data is often available only on either one or the other of the two types of film. Also, film projectors normally utilized in the home or in educational institutions are operated by unskilled personnel so that both conversion from one type of film feeding device to the other and the operation of each of the feeding devices must be simple and easily accomplished.

Accordingly, one object of this invention is to provide a new and improved film projector in which a plurality of different types of film feeding devices may be interchangeably used.

Another object is to provide such a projector with a new and improved film strip feeding device having provision thereon for stripping the film from the feeding device after the projection thereof.

Another object is to provide such a film strip feeding device in which an improved mask and lens holder is utilized.

A still further object is the provision of a film strip feeding device which is capable of being operated from a position remote from the device.

Another object is to provide a film projector in which the projecting apparatus is capable of being automatically adjusted to a desired position for projection.

A still further object is the provision of a film projector including an integral casting supported on the base of the projector and having means for adjustably positioning a focusing lens and for supporting a roll of film.

In accordance with these and many other objects, one embodiment of the invention comprises a film projector including a base member on which is pivotally mounted a supporting plate carrying a housing and a focus lens support. The housing is provided with means for supporting either a strip film feeding means or a film slide feeding means in a position interposed between a light source enclosed within the housing and a focusing lens slideably carried by the focus lens support. The film strip feeding means includes a unitary lens positioning and masking device detachably mounted thereon, and a film advancing means which is adapted to be actuated either by manual rotation of a knob carried on the device or by means of a remote control actuating means. The film slide feeding means includes a U-shaped trough having a V-shaped supporting surface and within which a slideably mounted element is manually moved to position slides in a position interposed between the light source and the focusing lens. This manually actuated feeding element is automatically returned to a loading position under the control of a spring interconnecting the feeding element with the U-shaped member.

The focus lens support of the projector is formed of a single integral casting, and is provided with a centrally apertured portion to slideably receive an adjustable focusing lens actuated by a concave rubber covered driving cylinder, and is also provided with a recessed upper portion adapted to receive and support therein, in alignment with the strip feeding device, a roll of film. The housing member is formed with a plurality of integral inclined slats in an upper wall thereof both to permit convectional currents of cooling air and to prevent glare from the enclosed source of light from reaching the eyes of the projector operator. The supporting plate, which is pivotally mounted to the base member, is provided with a spring loaded cam member which is controlled by threaded means carried by the base in order to adjustably position the projecting apparatus at a predetermined angle of inclination relative to the base member.

Other objects and advantages of the present invention will become apparent from the ensuing description of an illustrative embodiment thereof in the course of which reference is had to the accompanying drawings in which:

Fig. 2 is a side elevational view, in partial section, of the projector shown in Fig. 1;

Fig. 3 is an enlarged fragmentary cross sectional view taken along line 3—3 in Fig. 2 showing only the film strip feeding device;

Fig. 4 is an enlarged cross sectional view taken along line 4—4 in Fig. 3;

Fig. 5 is a front elevational view, in partial section, of a film slide feeding device adapted for use with the projector shown in Figs. 1 and 2 of the drawings;

Fig. 6 is a cross sectional view taken along line 6—6 in Fig. 5;

Fig. 7 is a sectional view taken along line 7—7 in Fig. 5 showing the position of the slide feeding device in relation to the projecting equipment;

Fig. 8 is an exploded view of manual means for framing and advancing the strip film in the feeding device shown in Fig. 3;

Fig. 9 is a cross sectional view taken along line 9—9 in Fig. 8;

Fig. 10 is a fragmentary cross sectional view taken along line 10—10 in Fig. 8.

Figure 1:
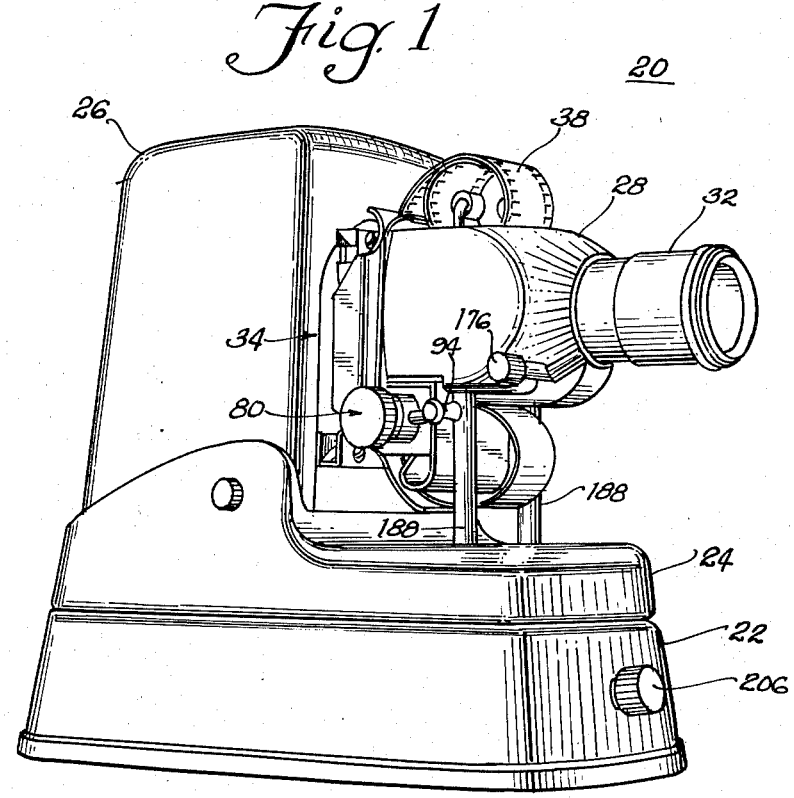
Fig. 1 is a perspective view of a film projector embodying the invention.

Referring now to Fig. 1 of the drawings, there is shown a film projector, indicated generally as 20, which includes a base portion 22 to which is pivotally secured a table 24 having a housing 26 and a focus lens support 28 mounted thereon. The housing 26 encloses a source of light and supports a collimating lens 30 (Fig. 11) for focusing this light to impinge upon a film 38 moved between the housing 26 and the focus lens support 28.

The focus lens support 28 includes an adjustable focusing lens assembly 32 positioned in alignment with the collimating lens 30. Either a film strip feeding device, indicated generally as 34, or a film slide feeding device, indicated as 36 (Fig. 5), is mounted on the housing 26 in a position interposed between this housing and the focusing lens 32 carried by the support 28. Both the film feeding means 34 and 36 include means for advancing frames of the film 38 into a position interposed between the lens 30 and the focusing or projection lens 32.

The film strip feeding device 34 (Figs. 2, 3 and 4), which sequentially advances a plurality of successive frames of the film 38 into a projecting position interposed between the lenses 30 and 32, includes a pair of guide plates 40 and 42 having outwardly curved upper extremities to facilitate insertion of the film 38 therein. The plates 40 and 42 are secured together in a face to face relationship by a plurality of rivets 44, and a centrally disposed portion of the engaged surfaces of these two plates are recessed or struck out to provide a channel 46 therebetween to receive the film 38.

To provide a means for permitting the beam of light formed by the lens 30 to pass through the film 38, both the plates 40 and 42 are provided with openings 48 and 50 (Figs. 2 and 4), respectively, which are positioned in alignment with each other. The opening 48 receives a lens 52 of transparent material which is held in position therein by a pair of spring arms 54, and a second lens 56 of transparent material is received within the opening 50.

In order to prevent excessive light from impinging upon the projection lens 32, a masking member 58 having a centrally disposed aperture 60 corresponding to the size of a single frame of the film 38 is secured to the outermost surface of the lens 56 (Fig. 4). A centrally disposed portion of the masking member 58 is struck out, as shown at 64, and the lens 56 is received and secured within this struck out portion so that when the masking member 58 is secured in a desired position in engagement with the outer surface of the member 42, the lens 56 is held out of engagement with the lens 52 to extend the channel 46 through which the film 38 is advanced. The masking member 58 and the lens 56 carried thereby are secured in position on the strip film feeding device by means of a pair of spring arms 66.

To advance the film 38, the device 34 is provided with a sprocket wheel 68 (Figs. 2 and 8) having two rows of spaced film engaging teeth 70 thereon. The teeth 70 extend through a pair of slots formed in a lower portion of the plate 40 and are received within the sprocket holes on the film 38. The sprocket wheel 68 is secured to a shaft 72 which is rotatably mounted in a bracket 76 secured to the guide plate 40. The shaft 72 is provided with a knurled knob 78 at one end thereof.

To quickly produce proper framing of the film 38, a manually actuated framing device, indicated generally as 80, is provided (Figs. 3 and 8). This framing device includes a shouldered plug or bushing 82 which is rotatably mounted in an aperture 84 in the bracket 76 and secured thereon by a lock nut 86 and a lock washer 90. A deformable washer 88 is interposed between the plug 82 and the outer wall of the bracket 76 to facilitate sliding movement therebetween. The plug 82 is centrally apertured to rotatably receive therein the shaft 72, and is provided with a transversely extending notch 92 at an outer edge thereof. The bushing 82 is also provided with a crank handle 94 so that the position thereof relative to the bracket 76 may be manually adjusted.

A plate 98, rotatably mounted on the shaft 72 and received within the notch 92, is provided with a pair of hemispherical protuberances 100 radially spaced on opposite sides of the shaft 72 and extending outwardly away from the outer surface of the bracket 76. These protuberances are urged into mating engagement with a plurality of hemispherical depressions 102 formed in a washer 104 by means of a coil spring 106 which is interposed between an inner surface of the plate 98 and a shouldered portion 108 of the aperture passing through the bushing 82. The washer 104 is secured to the knob 78.

To quickly produce framing of the film 38 relative to the aperture 60 (Fig. 3) in the masking member 58, the handle 94 is rotated in either a clockwise or counterclockwise direction to produce corresponding movement of the knob 78 and shaft 72, by virtue of the engaged protuberances 100 and depressions 102. When one frame of the film 38 is properly centered in the aperture 60, the handle 94 is released and the plate 98 controlled thereby remains fixed in a predetermined position. Thereafter, the knob 78 may be manually rotated to cam the protuberances 100 out of engagement with the aligned pair of depressions 102 by compressing the spring 106. Continuing rotation of the knob 78 moves the next pair of opposed depressions 102 into alignment with the protuberances 100 so that, as these elements move into interlocking engagement, the knob 78 is lightly retained in a position in which the next successive frame on the film 38 is centered within the masking aperture 60.

The only criteria, which must be fulfilled to achieve proper framing in this manner, is to insure that the spacing of the sprocket hole in the film 38 and the peripheral disposition of the teeth 70 on the sprocket wheel 68 is such that rotation of the knob 78 through any even multiple of 90 degrees advances the film 38 from one frame to the next following frame. Obviously the plate 98 and washer 104 may interchangeably be provided with either protuberances or depressions.

In order to operate the film strip feeding device 34 from a position remote from the projector 20, the shaft 72 is provided with a male plug 95 adapted to be received within a female socket carried by a flexible shaft drive 96 shown in dashed outline in Fig. 3 of the drawings. After the film 38 has been framed relative to the aperture 60, the shaft 72 may easily be actuated by the flexible shaft drive 96 from a position remote from the projector 20 since the engagement of the protuberances 100 and depressions 102 accurately position the frames of the film 38 relative to the aperture 60.

To provide a means for stripping the film 38 from the sprocket wheel 68, or for disengaging the teeth 70 from within the sprocket holes of the film 38, a J-shaped plate 110 is secured to the bracket 76, and is provided with a sharply curved lower portion 112 (Fig. 2), the upper end of which extends upwardly between the two spaced rows of teeth 70 into a recessed portion of the sprocket wheel 68. Since the end of the curved portion 112 extends radially inward toward the shaft 72 beyond the outer periphery of the teeth 70, the end of the film 38 is moved into engagement with this curved portion and is forced out of engagement with these teeth by continuing rotation of the sprocket drive wheel 68. The outer surface of the arcuate portion 112 prevents the end of the film 38 from becoming torn by engagement with any projections, and further guides the film into engagement with a cooperating arcuate portion 114 formed in the lower edge of the film guide plate 40. The portion 114, together with the arcuate portion 112, guides the end of the film 38 out of the film feeding means 34, and tends to deflect the leading edge of the film 38 in an upward direction to facilitate rewinding the film into a convolute body as it is successively advanced by the feeding means 34. The formation of the leading portion of the film 38 into the convolute body is facilitated by the natural tendency of this film to retain the form of the roll from which it was supplied.

In order to provide a means for securing the film strip advancing means 34 to the housing 26, the film guiding plate 40 is provided with a pair of rearwardly extending wings 116 (Figs. 2, 3 and 4) between which are secured a pair of brackets 118 having upwardly extending edge portions or rails 120. The brackets 118 are secured between the wings 116 with the edge or rail portions 120 thereof spaced a predetermined distance apart to be parallel to each other.

Figure 11:
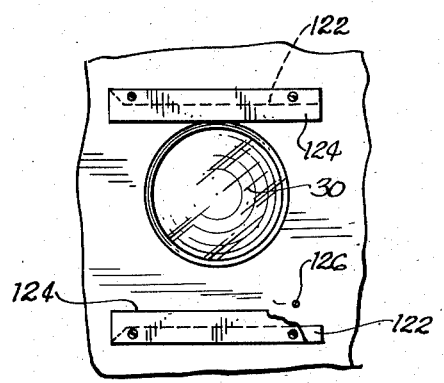
Fig. 11 is a fragmentary front elevational view of the projector shown in Fig. 1 with the film feeding device and focusing means removed.

To support the feeding device 34 on the housing 26, this housing is provided with a pair of integral projecting portions 122, which are positioned opposite each other on both sides of the lens 30 (Figs. 2 and 11). A pair of plates 124 are secured to the uppermost portion 122 and lowermost portion 122 so as to extend downwardly and upwardly therefrom, respectively, to form a pair of channels. To secure the device 34 in the projecting position with the masking aperture 60 interposed between the lenses 30 and 32, the rails 120 are inserted in the channels formed by the plates 124, and the device 34 is moved to the right, as shown in Fig. 11 of the drawings, until the leading edge of the lowermost rail 120 engages a stop member 126 carried by the housing 26. At this time, the masking aperture 60 is in a position in alignment with both of the lenses 30 and 32. The strip film feeding device 34 easily may be removed from this position by merely displacing this device to the left, as shown in Fig. 11.

The slide feeding device 36 (Figs. 5, 6 and 7) moves a film slide 125 from a loading position 142 to a projecting position 144 and, subsequently, moves the slide 125 to a removal or unloading position indicated as 160. The device 36 comprises a U-shaped member formed by a pair of side walls 132 and 134 between which is secured a spacing block 136 having a V-shaped notch 138 formed in an upper or supporting surface thereof. The side walls 134 and 132 are provided with aligned apertures 156 and 158, respectively, so that in the projecting position 144, the slide 125 is in alignment with the apertures 156 and 158 so that the beam of light provided by the lens 30 passes through the film to impinge upon the focusing lens 32.

In order to secure one of the slides 125 in the projecting position 144, the side walls 132 and 134 are provided with upwardly extending portions 133 and 135 which are joined together by a pair of rivets 137. The upper extremity of the portion 133 is folded over at right angles to engage the upper edge of the portion 135, and this folded portion resiliently supports a guide member 139 having a V-shaped notch 141 in the lower edge thereof. The guide member 139 is secured to the feeding device 36 by a flexible spring 143, and is provided with a pair of enlarged apertures 145 within which are positioned the shanks of the rivets 137.

When a slide 125 is moved into the position 144, the curved outer edge of the member 139 engages the upper surface of this slide, and the guide member 139 is displaced upwardly against the resilient action of the spring 143 to secure the slide in the desired projecting position.

In order to move a film slide from the loading position shown at 142 to the projecting position 144, a pusher assembly, indicated generally at 146, is provided. The assembly 146 includes a U-shaped plate 148 which is slideably mounted on the upper edges of the side walls 132 and 134. A block 150, which is secured to the plate 48 by a machine screw 151, is positioned within the walls 132, 134 and is provided with a flat surface 153 for engaging an end wall of the slide 125. A pin or round headed screw 155, carried by the block 150, cooperates with a slot 157 formed in the side wall 134 to limit the extent of movement of the assembly 146.

When it is desired to move a slide from the loading position shown at 142, a knob 152 secured to the plate 148 is manually apprehended, and the assembly 146 is moved to the right as shown in Fig. 5. This movement moves the surface 153 into engagement with an end wall of one of the slides 125, and continuing movement of the assembly 146 to the right moves the slide 125 to the projecting position shown at 144. The slide is accurately positioned as shown at 144 inasmuch as the cooperating pin 155 and slot 157 positively prevent movement of the assembly 146 beyond the point at which the slide 125 is properly positioned in the projecting position 144. A coil spring 149, which interconnects the machine bolt 151 with an end piece 140 secured between the side walls 132 and 134, automatically returns the assembly 146 to the position shown in Fig. 5 of the drawings.

The provision of the notches 138 and 141, together with the resiliently mounted guide member 139, permit the feeding device 36 to be used with slides 125 of varying widths since these notches and the resiliently mounted guide 139 cooperate to center each slide 125 relative to the feeding device 36. This centering action obviates the need for varying the focus of the lens 32 as successive slides 125 are moved into the projecting position.

The slides 125 are moved to the removal position 160 from the projecting position 144 in response to the movement of a second slide from the loading position 142 into the projecting position 144. The slides may either be removed manually from the position shown at 160 or, upon movement of a third slide to the projecting position 144, the first slide 125 may be permitted to fall from an open end of the feeding device 36 as shown at 162.

The slide feeding device 36 is adapted for mounting on the housing 26 by a pair of flanged members 164 and 166 (Fig. 7) which are secured to the side wall 134. The device 36 is mounted relatively close to the housing 26 to facilitate the projection of slides 125 having a large transparent area. The flange member 164 is provided with a downwardly extending edge or rail 168, and the flanged member 166 is provided with an upwardly extending edge or rail 170. These edges or rails are spaced the same predetermined distance apart as the edges or rails 120 on the film strip feeding device 34.

In order to support the device 36 on the housing 26 (Fig. 7), the upper rail 170 is placed in alignment with the notch formed by the uppermost plate 124, and the rail 168 is placed in the notch formed by the lowermost plate 124. Then, the entire assembly 36 is displaced to the right, as shown in Fig. 11 of the drawings, until the leading edge of the rail 168 engages the stop member 126. At this time, the slide feeding device 36 is positioned on the housing 26 with the apertures 156 and 158 in alignment with the beam of light provided by the lens 30.

To provide a means for varying the focus of the beam of light of varying intensity produced by the movement of the films 38 or 125 through the beam of light provided by the lens 30, the barrel of the focusing lens assembly 32 is slideably mounted within an opening 170 formed in the focus lens support 28. A concave rubber cylinder 172, mounted in a recessed portion 174 opening into the aperture 170, is in frictional engagement with the outer surface of the barrel of the focusing lens assembly 32 and is manually rotated by a knob 176 (Fig. 1) to move the lens assembly 32.

The focus lens support 28 also includes an arcuate recessed portion 180 which supports a roll of film 38. Each side wall of the recess 180 is provided with a shoulder portion 181 of a width approximately equal to the width of the edge portion of the film 38 having the sprocket holes therein. The shoulder 181 engages the edge portion of the film 38 to support the film in the recess 180 and also to hold the centrally disposed portion of the film 38 out of engagement with the bottom wall of the recess 180 to prevent scratching of the frames of the film.

A pair of upwardly extending arms 182, having rollers 184 thereon, are positioned directly opposite each other adjacent the edges of the recess 180 to aid in maintaining the roll of film 38 in this supply position and to facilitate guiding the trailing end of the film 38 between the film guiding members 40 and 42. The focus lens support 28 is secured to the supporting table 24 by a pair of posts 188 in such a position that the longitudinal axis of the focusing lens assembly 32 coincides with an axis passing through the center of the lens 30. The recess 180 is so positioned in the focus lens support 28 that the roll of film 38 positioned therein is in alignment with the passageway 46 formed by the film guide plates 40 and 42.

To provide a pivotal mounting for the table 24 to permit vertical adjustment on the beam provided by the focusing lens 32, the supporting table 24 is threadedly engaged by a pair of spaced machine bolts 190 (Fig. 2), only one of which is shown in the drawings. A coil spring 192 is interposed between a lower surface of the upper wall of the base 22 and the head of each of the machine bolts 190 so as to resiliently urge these bolts in a downward direction and, accordingly, to urge the lower edge of the supporting table 24 into engagement with the base 22. However, the provision of the coil spring 192 also permits the supporting table 24 and bolts 190 carried thereby to pivot relative to the base 22.

In order to automatically control and produce a predetermined amount of inclination of the supporting table 24 relative to the base 22, a slightly offset bolt or shaft 194, depending from the table 24, is provided with a cam surface 196. A sleeve 198 is secured to and depends from an upper wall of the base 22 and receives the lower end of the offset bolt 194. A coil spring 200 is positioned between a lower surface of the top wall of the table 24 and the upper surface of the top wall of the base 22, and resiliently urges the table 24 in an upward direction relative to the base 22. A collar 202 is interposed between the coil spring 200 and the offset shaft 194 and serves to maintain spring 200 in a position concentric with the shaft 194.

In order to control the relative positions of the table 24 and the base 22, a threaded member 204, having a knob 206 thereon, is threadedly engaged within the sleeve 198 with one end of the member 204 in engagement with the cam surface 196. As the member 204 is rotated in a counterclockwise direction to move to the right, as viewed in Fig. 2 of the drawings, the offset shaft 194 and the table 24 are permitted to move in a counterclockwise direction under the resilient action of the coil spring 200. When a predetermined position is reached, the threaded member 204 is rotated in a clockwise direction to force the offset shaft 194 into engagement with the lower edge of the sleeve 198, and to clamp this member in a predetermined position.

When it is desired to return the supporting table to a normal horizontal position, the threaded member 204 is rotated in a counterclockwise direction to release the shaft 194 from engagement with the sleeve 198, and the table 24 is manually depressed against the action of the spring 200. When the table 24 is positioned in the desired horizontal position, the threaded member 204 may be rotated in a clockwise direction to engage the cam surface 196 and clamp the table 24 in this position. A subsequent counterclockwise rotation of the threaded means 204 once again permits the shaft 194 to move upward, under the action of the spring 200, by producing a sliding engagement between the end of the threaded member 204 and the cam surface 196.

Therefore, the cam surface 196 and threaded member 204 cooperate to provide a fine control over the inclination of the projecting apparatus and also provide a means for positively securing the supporting table 24 in a desired position relative to the base 22. A nut 210 secured to the lower end of the shaft 194 engages the lower edge of the sleeve 198 and thereby limits the allowable amount of deflection of the supporting table 24 relative to the base 22.

With the foregoing detailed description in mind, it is believed that the general operation of the projector 20 will be easily understood. If it is desired to utilize the projector 20 for the production of pictures from a film strip, the strip film feeding device 34 is secured to the housing 26 by placing the rails 120 in alignment with the channels formed by the plates 124 (Fig. 2) and then sliding the feeding device 34 to the right, as shown in Fig. 11 of the drawings, until the leading edge of the lower rail 120 engages the stop member 126. At this time the masking aperture 60 (Fig. 3) is interposed in a position aligned with the columnating lens 30 and the focusing lens 32.

The roll of film 38 is then placed in the shouldered recess 180 formed in the focus lens support 28, and the leading edge of the film 38 is manually inserted between the outwardly flared ends of the film guide plates 40 and 42. The film 38 is manually advanced through the passageway 46 past the masking aperture 60 until such time as the sprocket holes in the film 38 are interposed between the teeth 70 of the sprocket wheel 68 and the film guide plate 40.

At this time the framing assembly 80 is actuated by rotating the handle 94 in either a clockwise or counterclockwise direction until a frame on the film 38 is centered with respect to the masking aperture 60. The knob 176 is then manually adjusted to vary the position of the focus lens assembly 32 so that the image provided by the frame, interposed between the lens and the source of light, is focused on the projection screen.

If the image provided by the projector 20 is not centered on the screen, the supporting table 24 is inclined from its normal horizontal position by rotating the threaded means 204 (Fig. 2) in a counterclockwise direction to permit the cam surface 196 to move upwardly relative to the end of the threaded means 204 under the resilient action of the spring 200. When the image provided by the projector 20 is properly centered on the screen, the threaded means 204 is rotated in a clockwise direction to engage the cam surface 196 of the offset shaft 194 and to move and clamp this shaft in engagement with a lower edge of the sleeve 198.

To move the next frame of the film 38 into alignment with the masking aperture 60, either the remote drive means 96 or the knurled knob 78 is rotated in a counterclockwise direction, as viewed in Fig. 1, to cam the protuberances 100 out of engagement with the depressions 102, and move them into engagement with the next opposed pair of depressions 102.

In order to utilize the projector 20 with the slides 125, the film strip feeding device 34 is moved to the left, as shown in Fig. 11 of the drawings, to move the rails 120 out of engagement with the channels provided by the plates 124, and the rails 168 and 170 of the slide feeding device 36 are moved into alignment therewith. Thereafter, the feeding device 36 is pushed to the left, as shown in Fig. 11 of the drawings, until the leading edge of the rail 168 engages the stop member 126. At this time, the aligned apertures 156 and 158 in the slide feeding device 36 will be interposed between the columnating lens 30 and the focusing lens 32 and in alignment therewith.

The first slide 125 to be projected is placed between the side walls 132 and 134 in the position indicated at 142, and the knob 152 is grasped and displaced to the right, as shown in Fig. 5 of the drawings, to move the end surface 153 into engagement with the mounted slide in the position 142. Continuing movement of the pusher assembly 146 to the right moves the slide 125 to the position indicated at 144 in which the film portion of the slide is centered with respect to the aligned apertures 156 and 158 so that a beam of light from the lens 30 passes therethrough to impinge upon the focus lens assembly 32. Upon release of the knob 152, the pusher assembly 146 is returned to the position shown in Fig. 5 by the coil spring 149.

Thereafter, a second slide 125 is positioned, as shown at 142, so that upon a second movement of the pusher assembly 146, the second slide 125 is moved into the position shown at 144 and the first slide 125 is moved to the position indicated at 160. The slide 125 in the position 160 may either be manually removed or may be displaced to the position shown at 162 by a subsequent movement of a third slide 125 into the projecting position 144. The slide feeding device 36 is easily removed from the housing 26 by moving the rails 168 and 170 out of engagement with the channel defining plates 124.

While the present invention has been described in connection with the details of an illustrative embodiment, it should be understood that these details are not intended to be limitative of the invention except in so far as set forth in the accompanying claim.

What is claimed as new and desired to be secured by Letters Patent of the United States is:

In a projector for use with film strip of a selected width, a base member, a lamp enclosing housing mounted on said base member, said housing defining an aperture, supporting means on said housing adjacent said aperture, a film strip feeding mechanism including a drive sprocket carried solely by said supporting means in alignment with said aperture, a projection lens, a lens housing mounting said projection lens, said lens housing being spaced from and in alignment with said aperture and said feeding mechanism, means for supplying said film strip to said feeding mechanism including a recess formed in an upper wall of said lens housing and guide arms positioned on said lens housing adjacent said recess to support a supply coil of said film strip, and a pair of spaced legs extending upwardly from said base member and supporting said lens housing, said legs being spaced at least said selected width from each other in a plane substantially parallel to the aperture and positioned adjacent said film feeding means so that said film feeding means discharges said film strip in a loose coil between said legs.

References Cited in the file of this patent

UNITED STATES PATENTS

| | | |
|---|---|---|
| 1,035,872 | Goodrich | Aug. 20, 1912 |
| 1,424,457 | Fergraus | Aug. 1, 1922 |
| 1,738,762 | De Vault | Dec. 10, 1929 |
| 2,168,987 | Hopkins et al. | Aug. 8, 1939 |
| 2,169,010 | Teague et al. | Aug. 8, 1939 |
| 2,172,256 | Nagel | Sept. 5, 1939 |
| 2,188,954 | Mulch | Feb. 6, 1940 |
| 2,231,743 | Young et al. | Feb. 11, 1941 |
| 2,143,160 | Koehl | May 27, 1941 |
| 2,251,077 | Stanton | July 29, 1941 |
| 2,330,709 | Harper et al. | Sept. 28, 1943 |
| 2,534,731 | Perillo | Dec. 19, 1950 |
| 2,534,732 | Perillo | Dec. 19, 1950 |
| 2,553,075 | Bradford | May 15, 1951 |
| 2,614,458 | Critoph et al. | Oct. 21, 1952 |
| 2,625,077 | Goldberg | Jan. 13, 1953 |
| 2,696,961 | Fox | Dec. 14, 1954 |